US012802343B2

United States Patent

(12) United States Patent
Bai et al.

(10) Patent No.: US 12,802,343 B2
(45) Date of Patent: Nov. 17, 2026

(54) PRESENTING VIRTUAL REPRESENTATION OF REAL SPACE USING SPATIAL TRANSFORMATION

(71) Applicant: REALSEE (BEIJING) TECHNOLOGY CO., LTD., Beijing (CN)

(72) Inventors: Jie Bai, Tianjin (CN); Yi Zhu, Tianjin (CN); Ning Tao, Tianjin (CN); Feng Guo, Tianjin (CN)

(73) Assignee: REALSEE (BEIJING) TECHNOLOGY CO., LTD., Beijing (CN)

( * ) Notice: Subject to any disclaimer, the term of this patent is extended or adjusted under 35 U.S.C. 154(b) by 511 days.

(21) Appl. No.: 18/276,020

(22) PCT Filed: Jun. 30, 2021

(86) PCT No.: PCT/CN2021/103835
§ 371 (c)(1),
(2) Date: Aug. 4, 2023

(87) PCT Pub. No.: WO2022/166092
PCT Pub. Date: Aug. 11, 2022

(65) Prior Publication Data

US 2024/0046554 A1 Feb. 8, 2024

(30) Foreign Application Priority Data

Feb. 5, 2021 (CN) ......................... 202110171986.9

(51) Int. Cl.
*G06T 15/20* (2011.01)
*G06T 15/00* (2011.01)
*G06T 19/20* (2011.01)

(52) U.S. Cl.
CPC .......... *G06T 15/205* (2013.01); *G06T 15/005* (2013.01); *G06T 19/20* (2013.01);
(Continued)

(58) Field of Classification Search
None
See application file for complete search history.

(56) References Cited

U.S. PATENT DOCUMENTS

2015/0358613 A1 12/2015 Sandrew et al.
2016/0232710 A1 * 8/2016 Herman ............... H04N 13/106
(Continued)

FOREIGN PATENT DOCUMENTS

CN 103489214 A 1/2014
CN 105046710 A 11/2015
(Continued)

OTHER PUBLICATIONS

Tawsif Ahmad Hussein Gokhool, "A Compact RGB-D Map Representation dedicated to Autonomous Navigation", Jul. 3, 2015, Université Nice Sophia Antipolis, Thesis.*
(Continued)

*Primary Examiner* — Robert Bader
(74) *Attorney, Agent, or Firm* — Enable IP, P.C.

(57) ABSTRACT

A method for presenting a virtual representation of a real space is provided. The method includes: obtaining a plurality of color images and a plurality of depth images respectively corresponding to the plurality of color images; for any of the plurality of observation points, superimposing a color image corresponding to the observation point and a depth image corresponding to the color image, to obtain a superimposed image; respectively mapping respective superimposed images corresponding to the plurality of observation points to a plurality of spheres in a virtual space; performing spatial transformation on vertices of the plurality of spheres
(Continued)

in the virtual space; and for any vertex of any of the spheres, performing spatial editing and shading, so as to obtain and present respective virtual representations, in the virtual space, of respective partial scenes of a real space.

16 Claims, 11 Drawing Sheets

(52) U.S. Cl.
CPC ................. *G06T 2219/2012* (2013.01); *G06T 2219/2016* (2013.01)

(56) References Cited

U.S. PATENT DOCUMENTS

| | | | | |
|---|---|---|---|---|
| 2017/0076429 | A1* | 3/2017 | Russell | G06T 15/04 |
| 2019/0026958 | A1* | 1/2019 | Gausebeck | G06T 7/579 |
| 2019/0385356 | A1 | 12/2019 | Lodato et al. | |
| 2020/0027261 | A1* | 1/2020 | Briggs | H04N 13/344 |
| 2020/0389639 | A1* | 12/2020 | Rhyu | H04N 13/194 |

FOREIGN PATENT DOCUMENTS

| | | | |
|---|---|---|---|
| CN | 107393018 | A | 11/2017 |
| CN | 110709892 | A | 1/2020 |
| CN | 112862981 | A | 5/2021 |
| JP | 2019128728 | A | 8/2019 |
| WO | 2017/042348 | A2 | 3/2017 |
| WO | 2017/180990 | A1 | 10/2017 |
| WO | 2018/222495 | A1 | 12/2018 |

OTHER PUBLICATIONS

Feng, Chun et al. "3D reconstruction and positioning for spheres based on RBG-D camera", Journal of Mechanical & Electrical Engineering, 2019, vol. 36, No. 5, pp. 549-554. <http://www.meem.com.cn>.

Ishizu, Takahiro et al. and Ito, Takao. "Hidden-Surface Processing for Interaction of Hand and Virtual Objects Using Leap Motion Controller", Faculty of Engineering, University of Miyazaki, and Graduate School of Engineering, Hiroshima University. 4 pages. <DOI: 10.1109/ICT-ROBOT.2018.8549875>.

* cited by examiner

200A

200B

800

900

1000

PRESENTING VIRTUAL REPRESENTATION OF REAL SPACE USING SPATIAL TRANSFORMATION

CROSS REFERENCE TO RELATED APPLICATIONS

This application is a U.S. national phase entry under 35 U.S.C. 371 of International Application No. PCT/CN2021/103835, filed on Jun. 30, 2021, which claims priority to Chinese Patent Application No. CN202110171986.9, filed on Feb. 5, 2021, the contents of which are hereby incorporated by reference in their entirety for all purposes.

TECHNICAL FIELD

The present disclosure relates to virtual reality (VR) technology, and in particular to a method and an apparatus for presenting a virtual representation of a real space, a computer device, a storage medium, and a computer program product.

BACKGROUND

Virtual reality technology has been applied in many fields. For example, this technology has been used to present interior scenes of a real space (for example, a house to be sold/rented), so that a user can intuitively understand various information in the real space. At present, commercially available technologies for presenting a real space requires three-dimensional modeling of a real space to generate a virtual reality image. A three-dimensional modeling process is complex and therefore requires a lot of computing power and processing time. Moreover, the virtual reality image cannot be viewed before a three-dimensional model is generated.

This may cause the following problems: 1. When viewing the virtual reality image, a user may have to wait long time, resulting in a poor user experience, 2. Once the three-dimensional model fails to be generated correctly, the virtual reality image cannot be generated, resulting in poor practicability.

SUMMARY

It will be advantageous to provide a mechanism to alleviate, mitigate or even eliminate one or more of the above-mentioned problems.

According to an aspect of the present disclosure, there is provided a method for presenting a virtual representation of a real space, comprising: obtaining a plurality of color images and a plurality of depth images respectively corresponding to the plurality of color images, wherein the plurality of color images correspond to respective partial scenes of the real space that are observed at a plurality of observation points in the real space, and the plurality of depth images respectively comprise depth information of the respective partial scenes; for any observation point, superimposing a color image in the plurality of color images that corresponds to the observation point and a depth image in the plurality of depth images that corresponds to the color image, to obtain a superimposed image; respectively mapping respective superimposed images corresponding to the plurality of observation points to a plurality of spheres in a virtual space, such that any of the spheres corresponds to a respective one of the plurality of observation points and comprises a plurality of vertices, any vertex having respective color information and respective depth information; performing spatial transformation on the vertices of the plurality of spheres in the virtual space based on a relative spatial relationship between the plurality of observation points in the real space; for any vertex of any of the spheres, performing spatial editing on the vertex based on depth information of the vertex: and for any vertex of any of the spheres, performing shading on the vertex based on color information of the vertex, to obtain, for presentation, respective virtual representations, in the virtual space, of the respective partial scenes of the real space.

According to another aspect of the present disclosure, there is provided an apparatus for presenting a virtual representation of a real space, comprising: an image obtaining unit configured to obtain a plurality of color images and a plurality of depth images respectively corresponding to the plurality of color images, wherein the plurality of color images correspond to respective partial scenes of the real space that are observed at a plurality of observation points in the real space, and the plurality of depth images respectively contain depth information of the respective partial scenes; an image superimposition unit configured to, for any observation point, superimpose a color image in the plurality of color images that corresponds to the observation point and a depth image in the plurality of depth images that corresponds to the color image, to obtain a superimposed image; a mapping unit configured to respectively map respective superimposed images corresponding to the plurality of observation points to a plurality of spheres in a virtual space, such that any of the spheres corresponds to a respective one of the plurality of observation points and comprises a plurality of vertices, any vertex having respective color information and respective depth information; a spatial transformation unit configured to perform spatial transformation on the vertices of the plurality of spheres in the virtual space based on a relative spatial relationship between the plurality of observation points in the real space; a vertex editing unit configured to, for any vertex of any of the spheres, perform spatial editing on the vertex based on depth information of the vertex; and a shading unit configured to, for any vertex of any of the spheres, perform shading on the vertex based on color information of the vertex, to obtain, for presentation, respective virtual representations, in the virtual space, of the respective partial scenes of the real space.

According to still another aspect of the present disclosure, there is provided a computer device, comprising: a memory, a processor, and a computer program stored on the memory, wherein the processor is configured to execute the computer program to implement the steps of the method as described above.

According to yet another aspect of the present disclosure, there is provided a non-transitory computer-readable storage medium having a computer program stored thereon, wherein the computer program, when executed by a processor, implements the steps of the method as described above.

According to yet another aspect of the present disclosure, there is provided a computer program product, comprising a computer program, wherein the computer program, when executed by a processor, implements the steps of the method as described above.

These and other aspects of the present disclosure will be clear from the embodiments described below, and will be clarified with reference to the embodiments described below.

BRIEF DESCRIPTION OF THE DRAWINGS

More details, features, and advantages of the present disclosure are disclosed in the following description of example embodiments in conjunction with the drawings, in which.

DETAILED DESCRIPTION OF THE EMBODIMENTS

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. As used herein, the term "plurality of" means two or more, and the term "based on" should be interpreted as "at least partially based on". Moreover, the terms "and/or" and "at least one of . . . " encompass any one of and all possible combinations of the listed items.

Example embodiments of the present disclosure are described in detail below in conjunction with the drawings.

Figure 1:
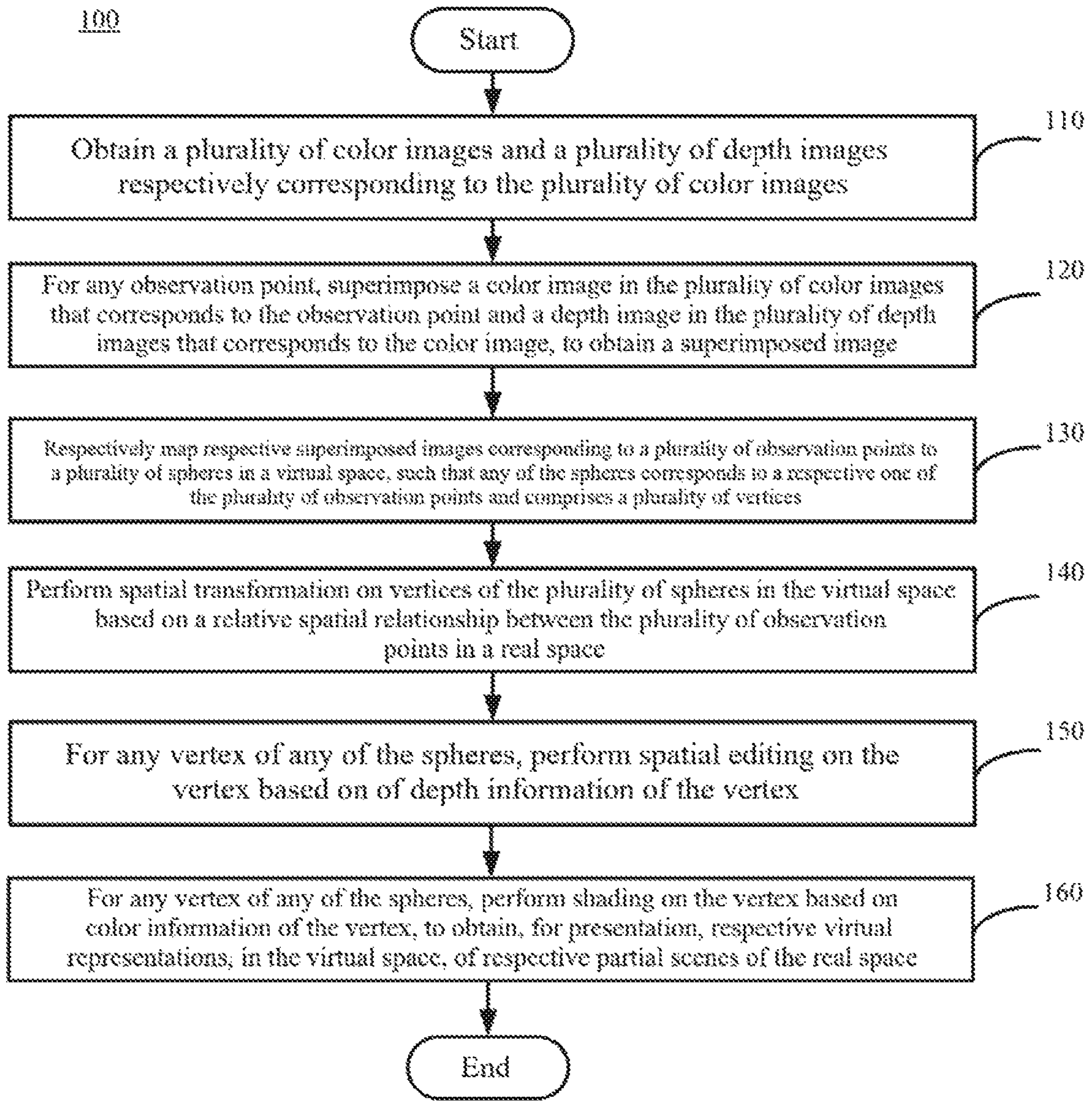
FIG. 1 is a flowchart of a method for presenting a virtual representation of a real space according to an example embodiment.

FIG. 1 shows a method 100 for presenting a virtual representation of a real space according to an example embodiment. As shown in FIG. 1, the method 100 generally comprises steps 110 to 160, which may be performed at a virtual reality terminal device, for example. However, the present disclosure is not limited in this respect.

At step 110, a plurality of color images and a plurality of depth images respectively corresponding to the plurality of color images are obtained. The plurality of color images correspond to respective partial scenes of the real space that are observed at a plurality of observation points in the real space, and the plurality of depth images respectively comprise depth information of the respective partial scenes.

In various embodiments, the real space may be a space inside various buildings such as a residential building, an office building, a factory, and a warehouse. In an example, an image capturing device (for example, a professional image acquisition device or a common camera) and a depth camera can be used to perform panoramic shooting at the plurality of observation points in the real space to capture the above-mentioned plurality of color images and depth images, respectively. The number of observation points may depend on the size of the real space. According to some implementations, the plurality of observation points may be evenly distributed inside the real space, such that all details of scenes inside the real space can be observed from the plurality of observation points without blind spots. For ease of explanation, a suite in a residential building is taken as an example of the real space throughout the following description, but the implementation of the present disclosure is not limited by a specific type of the real space.

Figure 2A:
FIGS. 2A and 2B respectively show an example color image and an example depth image obtained in the method of FIG. 1 according to an example embodiment.
Figure 2B:
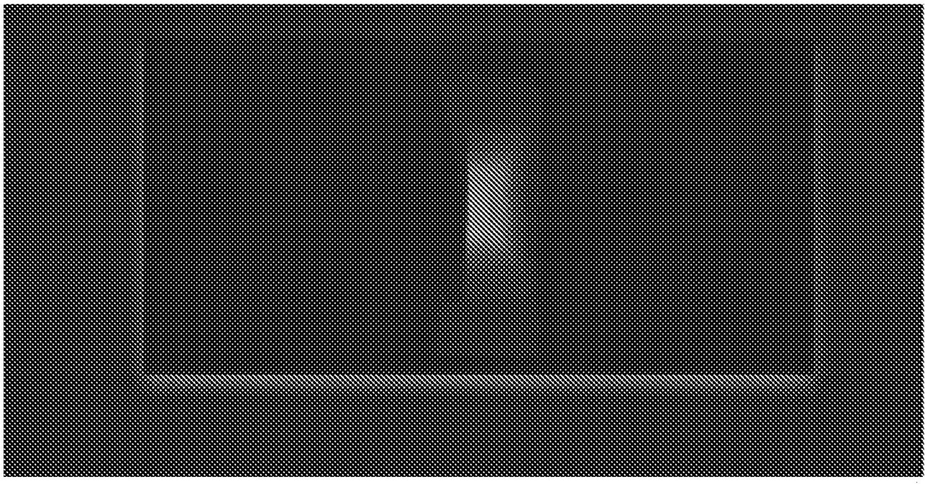

FIG. 2A shows an example color image 200A obtained in step 110, and the example color image is a single color image obtained by compositing (for example, through the Gauss-Krüger projection) six color images that are respectively captured from the six directions: up, down, left, right, front, and back at an observation point inside the suite. FIG. 2B shows an example depth image 200B obtained in step 110, and the example depth image is a depth image corresponding to the color image in FIG. 2A and captured at the observation point where the color image 200A is captured. According to some implementations, the color images and depth images that are captured by the image capturing device and the depth camera can then be directly sent to the virtual reality terminal device for subsequent use. According to some implementations, the color images and depth images that are captured by the image capturing device and the depth camera may be stored in a server. In this case, when a user requests to view a virtual representation of a real space, the terminal device can obtain the corresponding color images and depth images from the server, and complete a process of processing a virtual representation image for the user to view.

At step 120, for any observation point, a color image in the plurality of color images that corresponds to the observation point and a depth image in the plurality of depth images that corresponds to the color image are superimposed, to obtain a superimposed image.

For example, the color image 200A of FIG. 2A and the depth image 200B of FIG. 2B are superimposed, such that a superimposed image corresponding to the observation point where the color image 200A and the depth image 200B are captured can be obtained. The superimposed image comprises a plurality of pixels, and each pixel comprises color information of a corresponding pixel in the color image and depth information of a corresponding pixel in the depth image. The superimposition process can be performed in image processing software such as web GL/open GL. In one example, the color image and the depth image are first adjusted to two images having the same resolution, such that the color image and the depth image comprise the same number of pixels. This adjustment step can be implemented through operations such as scaling up, scaling down, or stretching the images. Then, the color image and the depth image are superimposed, such that pixels of the color image and pixels of the depth image are in a one-to-one correspondence, thereby obtaining the superimposed image.

At step 130, respective superimposed images corresponding to the plurality of observation points are respectively mapped to a plurality of spheres in a virtual space, such that any of the spheres corresponds to a respective one of the plurality of observation points and comprises a plurality of vertices, and any vertex has respective color information and respective depth information.

According to some implementations, a virtual space can be created by using image processing software such as web GL/open GL, and a plurality of spheres are set in the virtual space, so as to present the above-mentioned plurality of superimposed images in the virtual space. The number of spheres is the same as that of observation points, and each superimposed image is projected onto its corresponding sphere by mapping, thereby obtaining a plurality of sphere images. Projecting a plane image onto a sphere is a technique well known to those of ordinary skill in the field of image processing, and details will not be described herein.

Figure 3:
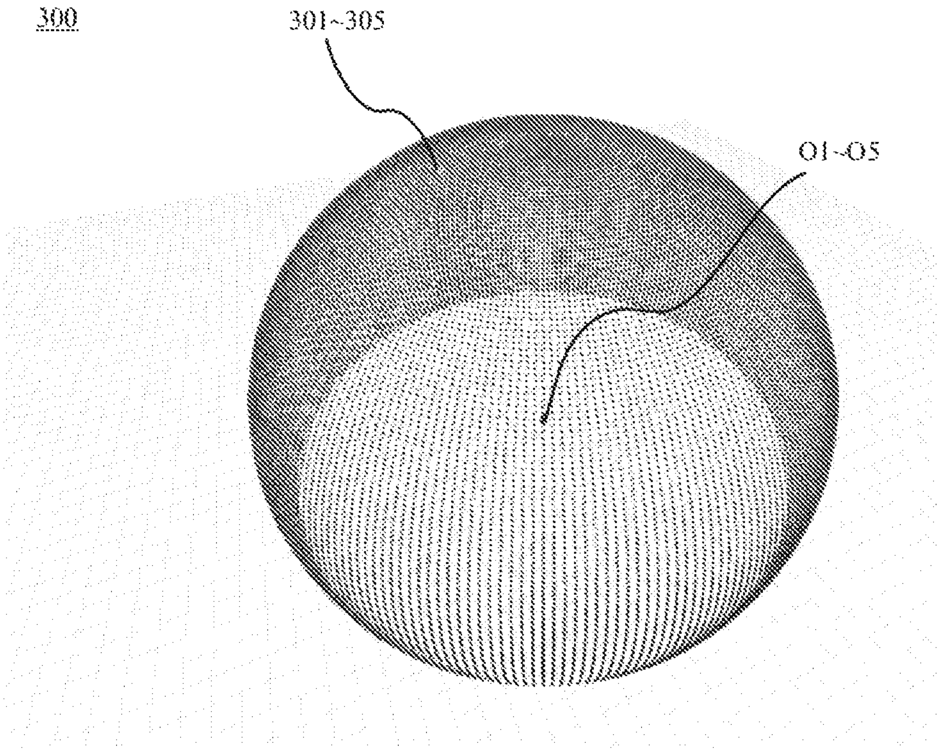
FIG. 3 shows an example image obtained by respectively mapping respective superimposed images corresponding to a plurality of observation points to a plurality of spheres in a virtual space in the method of FIG. 1 according to an example embodiment.

FIG. 3 shows an example image 300 obtained by respectively mapping respective superimposed images corresponding to five observation points in a real space to a plurality of spheres 301 to 305 in a virtual space. In this example, the spheres 301 to 305 are initially positioned at the same sphere centers O1 to O5 and have the same radius. Therefore, the spheres 301 to 305 are shown as a coincident sphere in FIG. 3. In some embodiments, the radii of the plurality of spheres 301 to 305 may be different, and the centers of the spheres may not be at the same position either. The present disclosure does not limit the initial radii and sphere center positions of the plurality of spheres.

The images on the spheres 301 to 305 are presented in the virtual space in the form of a point cloud. As shown in FIG. 3, any of the spheres 301 to 305 comprises a plurality of vertices, and any vertex has respective color information and respective depth information. In computer graphics, a three-dimensional image (including a sphere) is usually represented as a collection of deltahedra, and vertices in computer graphics are geometric vertices of these deltahedra. The position and shape of a sphere can be adjusted by operating the plurality of vertices. In one example, coordinates of the vertices and the number of vertices can be determined by using a function embedded in the image processing software such as web GL/open GL, so as to accurately adjust the position of the entire sphere.

At step 140, spatial transformation is performed on vertices of the plurality of spheres in the virtual space based on a relative spatial relationship between the plurality of observation points in the real space.

The purpose of the spatial transformation is to make the distribution of the plurality of superimposed images mapped to the plurality of spheres in the virtual space correspond to the relative spatial relationship between the plurality of observation points in the real space. In this embodiment, a spatial transformation matrix embedded in the image processing software such as web GL/open GL can be invoked to perform the spatial transformation on the coordinates of the vertices. Transformation parameters in the spatial transformation matrix can be determined when the color images and the depth images are captured at the observation points, and saved for subsequent provision to the image processing software. The spatial transformation may comprise scaling, rotation, and/or translation. For example, in some embodiments, the spatial transformation comprises two of scaling, rotation, and translation. In other embodiments, the spatial transformation may comprise all three of scaling, rotation, and translation.

Figure 4:
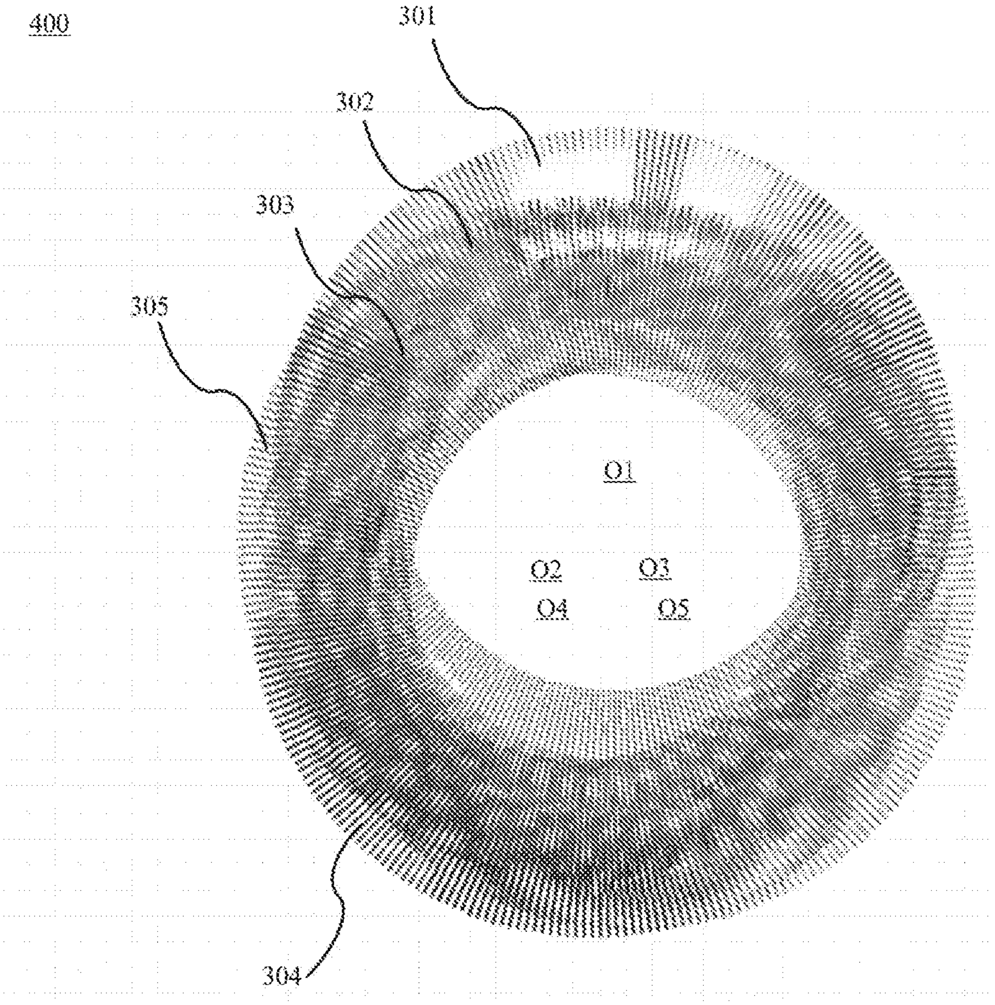
FIG. 4 shows an example image obtained by rotating and translating the plurality of spheres in FIG. 3.

FIG. 4 shows an example image 400 obtained by rotating and translating the plurality of spheres 301 to 305 in FIG. 3. As shown in FIG. 4, after the spatial transformation, the spheres 301 to 305 that originally coincide in FIG. 3 are now positioned at their respective different sphere centers O1 to O5, and a relative spatial relationship between the sphere centers O1 to O5 is consistent with the relative spatial relationship between the respective observation points in the real space.

At step 150, for any vertex of any of the spheres, spatial editing is performed on the vertex based on depth information of the vertex.

According to some implementations, the spatial editing can be performed by the vertex shader embedded in the image processing software such as web GL/open GL. The vertex shader is a set of instruction code that is executed when the vertices are rendered. In an example, the vertex shader first obtains vertex coordinates of any vertex on the sphere, and then moves the coordinates of any vertex by an offset distance along the normal of the vertex, wherein the offset distance corresponds to the depth information of the vertex. Depth information is actually information indicating the distance between an observation point and a real spatial scene. Therefore, after corresponding vertices are respectively offset along the normals of the vertices based on the depth information, the contour shape of a scene inside the real space can be obtained.

Figure 5:
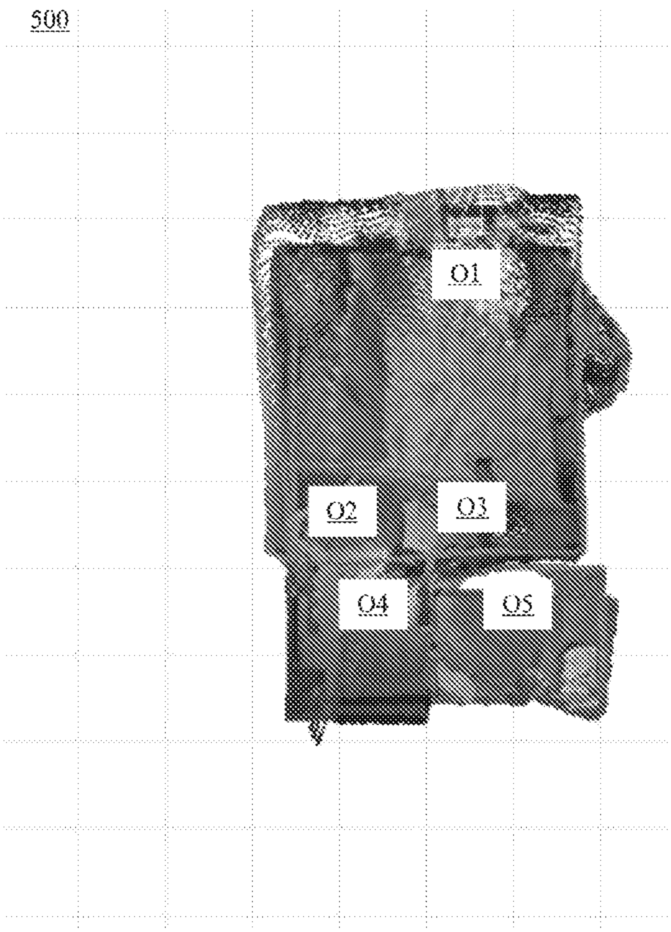
FIG. 5 shows an example image obtained by performing spatial editing on vertices of any of the spheres in FIG. 4.

FIG. 5 shows an example image 500 obtained by performing spatial editing on the vertices of the spheres 301 to 305 in FIG. 4, with the sphere centers O1 to O5 representing a first observation point to a fifth observation point in the real space, respectively. It can be seen intuitively from FIG. 5 that, the relative spatial relationship between the sphere centers O1 to O5 now reflects the relative spatial relationship between the respective observation points in the real space.

Figure 6:
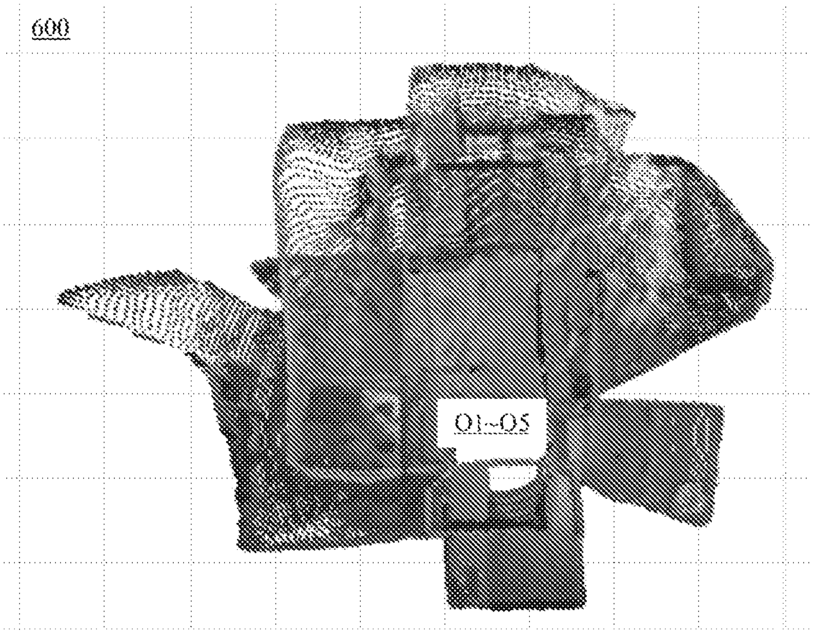
FIG. 6 shows an example image obtained after spatial editing is performed on vertices of the spheres corresponding to the observation points in FIG. 3.

It can be understood that the execution sequence of step 140 and step 150 may also be exchanged. In other words, the spatial editing may be performed on the vertices of any of the spheres before the spatial transformation of any of the spheres. FIG. 6 shows an example image 600 obtained by performing spatial editing on the vertices of the spheres 301 to 305 in FIG. 3. As shown in FIG. 6, since the spatial transformation such as translation is not performed, the sphere centers O1 to O5 of the spheres 301 to 305 are still positioned at the same position. However, because the vertices on any of the spheres have undergone the spatial editing (for example, the coordinates of any vertex are moved along the normal of the vertex by an offset distance corresponding to the depth information of the vertex), the spheres 301 to 305 that are originally shown as "spheres" in FIG. 3 are now no longer spheres. The virtual space image 500 shown in FIG. 5 can still be obtained after the virtual space image 600 has undergone the spatial transformation described above with respect to step 140.

At step 160, for any vertex of any of the spheres, shading is performed on the vertex based on color information of the vertex, to obtain, for presentation, respective virtual representations, in the virtual space, of the respective partial scenes of the real space.

According to some implementations, the shading can be performed on any vertex of the sphere by using a fragment shader embedded in the image processing software such as web GL/open GL. In an example, the color information of the vertex and the coordinates of the vertex are input to the fragment shader, and then the fragment shader may perform shading on the vertex based on the color information, so as to truly restore the color distribution of a partial scene in the real space. After the shading of the vertices is completed, a final virtual representation of the real space is obtained. The virtual representation reflects various partial scenes in the real space, including contour shapes and color distribution, and can be presented to the user at the terminal device.

According to this embodiment of the present disclosure, the color images and the depth images captured at the plurality of observation points in the real space are processed, such that the virtual representation image of the real space can be obtained without building a three-dimensional model for the real space. Therefore, a computing amount of the terminal device is greatly reduced, and a time for generating the virtual representation image is reduced. This helps reduce the user's waiting time and greatly improves the user experience. In addition, only a small amount of original image data is required, a process of generating the virtual representation image is simple, and high practicability is provided.

Figure 7:
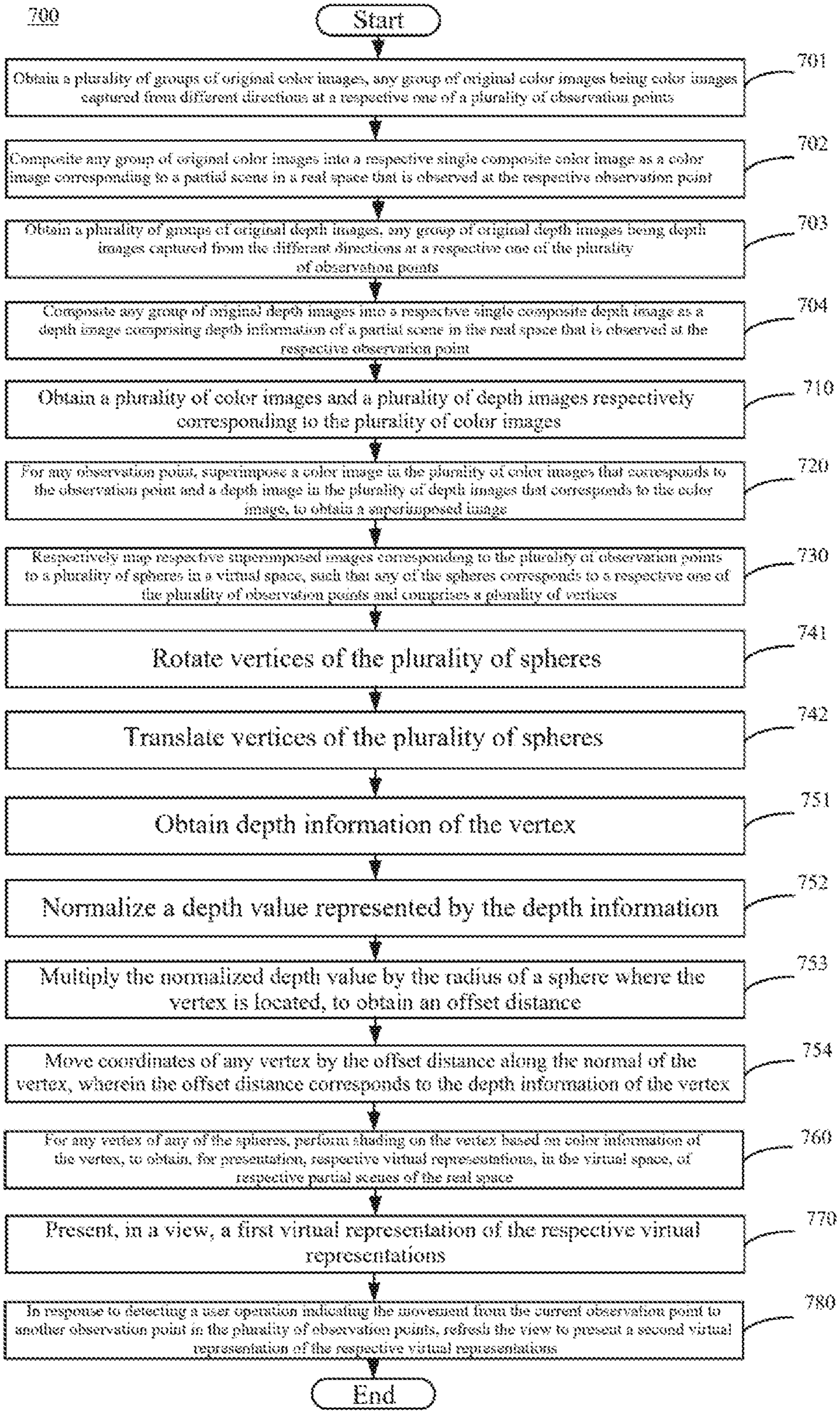
FIG. 7 is a flowchart of a method for presenting a virtual representation of a real space according to another example embodiment.

FIG. 7 is a flowchart of a method 700 for presenting a virtual representation of a real space according to another example embodiment. As shown in FIG. 7, the method 700 comprises steps 701 to 780.

At step 701, a plurality of groups of original color images are obtained, any group of original color images being color images captured from different directions at one respective observation point of a plurality of observation points. In an example, six color images of the real space may be respectively captured from the six directions: up, down, left, right, front, and back at any observation point. It can be understood that more/less color images may also be obtained from more/less directions. For example, 4, 8, or 12 color images may be captured, and the present disclosure is not limited in this respect.

At step 702, any group of original color images are composited into a respective single composite color image as a color image corresponding to a partial scene in the real space that is observed at the respective observation point. In various embodiments, various image projection methods can be used to project any group of six original color images onto the same plane, thereby obtaining a single composite color image. According to some implementations, the group of original color images can be composited into the above-mentioned single composite color image through the Gauss-Krüger projection. In one example, the color images of the six directions are first combined into a skybox map of a cube. Then imagine that there is an elliptic cylinder wrapping around the cube of the skybox map and tangent to the cube, with the central axis of the elliptic cylinder passing through the center of the cube. Then images within a specific range of the skybox map are projected onto the elliptic cylinder, and this cylinder is expanded to become a projection plane. In other embodiments, other appropriate image projection methods can also be used to composite the six original color images into a single color image, and these methods are not listed herein.

At step 703, a plurality of groups of original depth images are obtained, any group of original depth images being depth images captured from the different directions at a respective one of the plurality of observation points. The operation of step 703 may be similar to the operation of step 701, except that step 703 involves the use of a depth camera (or another depth capturing device).

At step 704, any group of original depth images are composited into a respective single composite depth image as a depth image comprising depth information of a partial scene in the real space that is observed at the respective observation point. The operation of step 704 may be similar to the operation of step 702, and details are not described herein again.

At step 710, a plurality of color images and a plurality of depth images respectively corresponding to the plurality of color images are obtained. The operation of step 710 is the same as the operation of step 110 described above with respect to FIG. 1, and details are not described again for the sake of brevity.

At step 720, for any observation point, a color image in the plurality of color images that corresponds to the observation point and a depth image in the plurality of depth images that corresponds to the color image are superimposed, to obtain a superimposed image. The operation of step 720 is the same as the operation of step 120 described above with respect to FIG. 1, and details are not described again for the sake of brevity.

At step 730, respective superimposed images corresponding to the plurality of observation points are respectively mapped to a plurality of spheres in a virtual space, such that any of the spheres corresponds to a respective one of the plurality of observation points and comprises a plurality of vertices. The operation of step 730 is the same as the operation of step 130 described above with respect to FIG. 1, and details are not described again for the sake of brevity.

Steps 741 and 742 correspond to step 140 described above with respect to FIG. 1, and details are described as follows.

At step 741, vertices of the plurality of spheres are rotated, and the angle of rotation is based on a degree of coincidence between the partial scene observed at an observation point corresponding to a sphere where the vertex is located and the partial scene observed at another observation point in the plurality of observation points.

According to some implementations, a reference observation point may be set in advance. For example, an observation point at the center of the real space may be set as the reference observation point. Then vertices of a sphere corresponding to another observation point are rotated relative to a sphere corresponding to the reference observation point (hereinafter referred to as a reference sphere). In order to form a virtual image capable of a point-of-view walk function, an angle of rotation of a sphere corresponding to any observation point relative to the reference sphere should be the same as a degree of coincidence between partial scenes observed at the two observation points in the real world, so as to implement the correct angle-of-view switching during a walk between the two observation points. In an example, according to a degree of coincidence between partial scenes observed at another observation point (denoted as an observation point 1) and the reference observation point, it is determined that a sphere corresponding to the observation point 1 is to be rotated by 30° relative to the reference sphere. Then the angle of rotation may be input to the image processing software as a rotation parameter, and the image processing software generates a rotation matrix according to the rotation parameter, and applies the rotation matrix to all vertices of the sphere corresponding to the observation point 1, so as to rotate the entire sphere corresponding to the observation point 1. Spheres corresponding to the remaining observation points are sequentially rotated by using a similar method, to obtain a virtual space image after the rotation is completed.

At step 742, translation is performed on the vertices of the plurality of spheres, and the distance of translation is based on a relative spatial position between the observation point corresponding to the sphere where the vertex is located and the another observation point in the plurality of observation points.

According to some implementations, the spheres corresponding to all the observation points are translated relative to the reference sphere. In order to form a virtual image capable of a point-of-view walk function, a distance of translation of the sphere corresponding to any observation point relative to the reference sphere should be the same as a spatial distance between the two observation points in the real world, so as to implement the correct representation of a movement distance during a walk between the two observation points. For example, assuming that 1 m in the real world corresponds to 1 unit of distance in the virtual space, if the observation point 1 and the reference observation point are 5 m apart in the real world, the sphere corresponding to the observation point 1 is to be translated for 5 units of distance relative to the reference sphere. The direction of translation should also be the same as the direction of the observation point 1 relative to the reference observation point in the real world. The distance of translation may be input to a program of the image processing software as a translation parameter, and the image processing software generates a translation matrix according to the translation parameter, and applies the translation matrix to all the vertices of the sphere corresponding to the observation point 1, so as to translate the entire sphere corresponding to the observation point 1. The spheres corresponding to the remaining observation points are sequentially translated by using a similar method, to obtain a virtual space image after the rotation and translation are completed, for example, the image 400 as shown in FIG. 4.

It can be understood that the execution sequence of step 741 and step 242 may be exchanged. In other words, the virtual space image 400 as shown in FIG. 4 can also be obtained by first translating and then rotating the spheres.

Steps 751 to 754 correspond to step 150 described above with respect to FIG. 1, and details are described as follows.

At step 751, depth information of any vertex is obtained. According to some implementations, since the vertex already comprises the depth information, in step 751, the vertex shader of the image processing software can directly obtain the depth information of any vertex.

At step 752, a depth value represented by the depth information is normalized.

At step 753, the normalized depth value is multiplied by the radius of a sphere where the vertex is located, to obtain an offset distance.

Normalization is a dimensionless processing means. Through normalization, an absolute depth value of the depth information can be turned into a relative value with respect to a preset depth value. For example, the preset depth value in the real space may have a correspondence with the radius of a sphere in the virtual space; therefore, a depth value of a vertex of the sphere can be converted to a ratio of the depth value to the preset depth value through normalization, and then the ratio is multiplied by the radius of the sphere to obtain the offset distance to be moved.

At step 754, coordinates of any vertex are moved for the offset distance along the normal of the vertex, wherein the offset distance corresponds to the depth information of the vertex.

The operations of steps 752 to 754 are used to sequentially perform spatial editing on any vertex of the spheres corresponding to the remaining observation points to obtain a virtual space image after the spatial editing is completed, for example, the image 500 as shown in FIG. 5.

At step 760, for any vertex of any of the spheres, shading is performed on the vertex based on color information of the vertex, to obtain, for presentation, respective virtual representations, in the virtual space, of the respective partial scenes of the real space. The operation of step 760 is the same as the operation of step 160 described above with respect to FIG. 1, and details are not described again for the sake of brevity.

At step 770, a first virtual representation of the respective virtual representations is presented in a view, wherein the first virtual representation corresponds to the current observation point in the plurality of observation points.

Figure 8:
FIG. 8 shows an example view presented in a view window while a user is viewing a virtual representation image according to an example embodiment.

According to some implementations, the user can open a virtual reality application pre-installed on the terminal device, to view a virtual representation image of the real space. In an example, the virtual reality application may be an application, such as online house viewing, that uses VR technology to view scenes inside a house. After the application is opened, a list of houses may be first presented to the user for selection. After the user selects a house to view, a respective virtual representation may be presented in a view window for the user to view. In addition, an observation point may be pre-selected or automatically selected, with viewing starting from the selected observation point, and the view window will present a respective virtual representation as the current observation point. FIG. 8 shows an example view 800 presented in a view window while a user is viewing a virtual representation image, wherein a third observation point (not shown in FIG. 8) is the current observation point. The user can switch between observation points by operating an input apparatus (e.g. a mouse or a keyboard) of the terminal device. For example, the user switches to a first observation point OB1 or a second observation point OB2, so as to view a partial scene in the real space from different angles of view.

At step 780, in response to detecting a user operation indicating the movement from the current observation point to another observation point in the plurality of observation points, the view is refreshed to present a second virtual representation of the respective virtual representations, wherein the second virtual representation corresponds to the another observation point.

Figure 9:
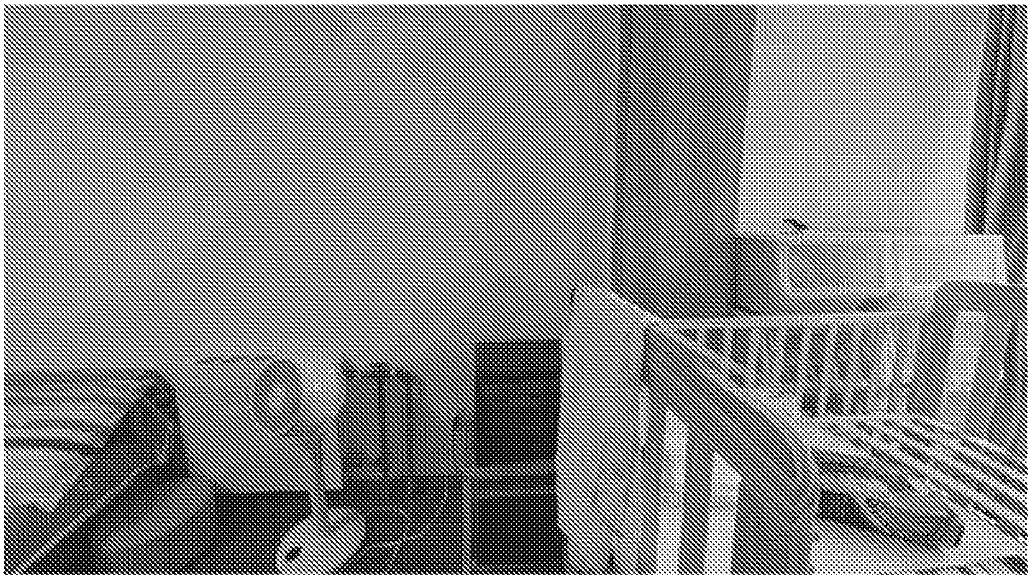
FIG. 9 shows an example view presented in the view window after the user switches an observation point according to an example embodiment.
Figure 10:
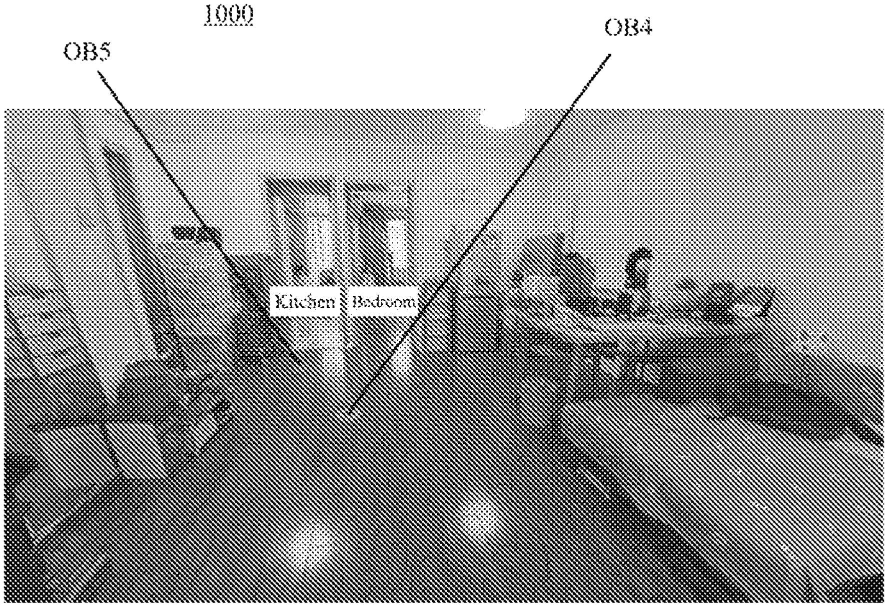
FIG. 10 shows an example view presented in the view window after the user switches an observation point according to an example embodiment.

During viewing, the user can walk between different observation points by operating the input apparatus. In an example, as shown in FIG. 8, when the user clicks/taps on the first observation point OB1 or the second observation point OB2 in the view 800, the view window will present a virtual representation image corresponding to the first observation point OB1 or the second observation point OB2. As shown in FIG. 9, when the angle of view is switched to the first observation point OB1, the view window refreshes the view and displays a virtual representation image 900 corresponding to the first observation point OB1. As shown in FIG. 10, when the angle of view is switched to the second observation point OB2, the view window refreshes the view and displays a virtual representation image 1000 corresponding to the second observation point OB2. At the second observation point OB2, as shown in FIG. 10, the angle of view can be further switched to a fourth observation point OB4 or a fifth observation point OB5. Through the above operations, the user can switch the angle of view between all observation points, thereby achieving the simulation effect of the user walking inside the entire real space. In some embodiments, while the view window is refreshing the view, a gradient effect can be added to two consecutive views, such that the angle-of-view switching process seems more natural.

Although the various operations are depicted in the drawings in a particular order, this should not be understood as requiring that these operations must be performed in the particular order shown or in a sequential order, nor should it be understood as requiring that all operations shown must be performed to obtain the desired result.

Figure 11:
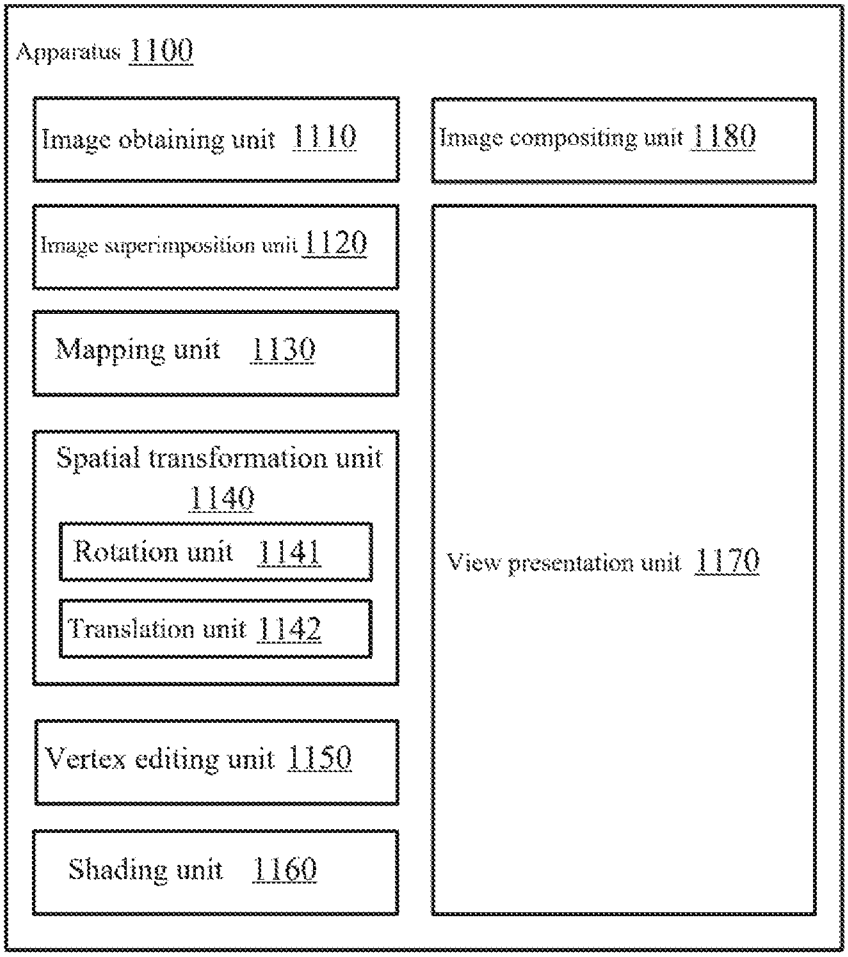
FIG. 11 is a structural block diagram of an apparatus for presenting a virtual representation of a real space according to an example embodiment.

FIG. 11 is a structural block diagram of an apparatus 1100 for presenting a virtual representation of a real space according to an example embodiment. As shown in FIG. 11, the apparatus 1100 comprises an image obtaining unit 1110, an image superimposition unit 1120, a mapping unit 1130, a spatial transformation unit 1140, a vertex editing unit 1150, and a shading unit 1160.

The image obtaining unit 1110 is configured to obtain a plurality of color images and a plurality of depth images respectively corresponding to the plurality of color images. The plurality of color images correspond to respective partial scenes of the real space that are observed at a plurality of observation points in the real space, and the plurality of depth images respectively comprise depth information of the respective partial scenes.

The image superimposition unit 1120 is configured to, for any observation point, superimpose a color image in the plurality of color images that corresponds to the observation point and a depth image in the plurality of depth images that corresponds to the color image, to obtain a superimposed image. The superimposed image comprises a plurality of pixels, and each pixel comprises color information of a corresponding pixel in the color image and depth information of a corresponding pixel in the depth image.

The mapping unit 1130 is configured to respectively map respective superimposed images corresponding to the plurality of observation points to a plurality of spheres in a virtual space, such that any of the spheres corresponds to a respective one of the plurality of observation points and comprises a plurality of vertices, and any vertex has respective color information and respective depth information.

The spatial transformation unit 1140 is configured to perform spatial transformation on vertices of the plurality of spheres in the virtual space based on a relative spatial relationship between the plurality of observation points in the real space.

The vertex editing unit 1150 is configured to, for any vertex of any of the spheres, perform spatial editing on the vertex based on depth information of the vertex.

The shading unit 1160 is configured to, for any vertex of any of the spheres, perform shading on the vertex based on color information of the vertex, to obtain, for presentation, respective virtual representations, in the virtual space, of the respective partial scenes of the real space.

The vertex editing unit 1150 is further configured to: move coordinates of the vertex to be edited by an offset distance along the normal of the vertex, wherein the offset distance corresponds to the depth information of the vertex.

In some embodiments, the vertex editing unit 1150 is further configured to: obtain the depth information of the vertex to be edited: normalize a depth value represented by the depth information; and multiply the normalized depth value by the radius of a sphere where the vertex is located, to obtain the offset distance.

In some embodiments, the spatial transformation unit 1140 is further configured to: for any vertex of any of the spheres, perform spatial transformation on coordinates of the vertex by using a spatial transformation matrix. The spatial transformation may comprise scaling, rotation, and/or translation.

In some embodiments, the spatial transformation unit 1140 may comprise a rotation unit 1141 and a translation unit 1142. The rotation unit 1141 is configured to rotate the coordinates of the vertex by using a rotation matrix, and the angle of rotation is based on a degree of coincidence between the partial scene observed at an observation point corresponding to a sphere where the vertex is located and the partial scene observed at another observation point in the plurality of observation points. The translation unit 1142 is configured to translate the coordinates of the vertex by using a translation matrix, and the distance of translation is based on a relative spatial position between an observation point corresponding to a sphere where the vertex is located and another observation point in the plurality of observation points.

In some embodiments, the shading unit 1160 is further configured to input the color information of the vertex and coordinates of the vertex to a fragment shader, to perform the shading.

In some embodiments, the apparatus 1100 may further comprise a view presentation unit 1170. The view presentation unit 1170 is configured to present, in a view, a first virtual representation of the respective virtual representations, wherein the first virtual representation corresponds to the current observation point in the plurality of observation points.

In some embodiments, the view presentation unit 1170 is further configured to, in response to detecting a user operation indicating the movement from the current observation point to another observation point in the plurality of observation points, refresh the view to present a second virtual representation of the respective virtual representations, wherein the second virtual representation corresponds to the another observation point.

In some embodiments, the image obtaining unit 1110 is further configured to receive the plurality of color images and the plurality of depth images from a server.

In some embodiments, the apparatus 1100 may further comprise an image compositing unit 1180 configured to: obtain a plurality of groups of original color images, any group of original color images being color images captured from different directions at a respective one of the plurality of observation points; and composite any group of original color images into a respective single composite color image as a color image corresponding to a partial scene in the real space that is observed at the respective observation point.

In some embodiments, the image compositing unit 1180 is further configured to: obtain a plurality of groups of original depth images, any group of original depth images being depth images captured from the different directions at a respective one of the plurality of observation points; and composite any group of original depth images into a respective single composite depth image as a depth image comprising depth information of the partial scene in the real space that is observed at the respective observation point.

It should be understood that the units of the apparatus 1100 shown in FIG. 11 may correspond to the steps in the method 700 described with reference to FIG. 7. Therefore, the operations, features, and advantages described above for the method 700 are also applicable to the apparatus 1100 and the units included therein. For the sake of brevity, some operations, features, and advantages are not described herein again.

Although specific functions are discussed above with reference to specific units, it should be noted that the functions of the various units discussed herein may be divided into plurality of units, and/or at least some functions of the plurality of units may be combined into a single unit. The specific unit performing actions discussed herein comprises the specific unit performing the action itself, or alternatively, this specific unit invoking or otherwise accessing another component or unit that performs the action (or performs the action together with this specific unit). Thus, the specific unit performing the action may comprise this specific unit performing the action itself and/or another unit that this specific unit invokes or otherwise accesses to perform the action.

It should be further understood that, various technologies may be described herein in the general context of software and hardware elements or program modules. The various units described above with respect to FIG. 11 may be implemented in hardware or in hardware incorporating software and/or firmware. For example, these units may be implemented as computer program code/instructions configured to be executed in one or more processors and stored in a computer-readable storage medium. Alternatively, these units may be implemented as hardware logic/circuitry. For example, in some embodiments, one or more of the units described above with respect to FIG. 11 may be implemented together in a system-on-chip (SoC). The SoC may comprise an integrated circuit chip (which comprises a processor (e.g., a central processing unit (CPU), a microcontroller, a microprocessor, a digital signal processor (DSP), etc.), a memory, one or more communication interfaces, and/or one or more components in other circuits), and may optionally execute the received program code and/or comprise embedded firmware to perform functions.

According to an aspect of the present disclosure, there is provided a computer device, comprising a memory, a processor, and a computer program stored on the memory. The processor is configured to execute the computer program to implement the steps of any one of the method embodiments described above.

According to an aspect of the present disclosure, there is provided a non-transitory computer-readable storage medium having a computer program stored thereon, wherein when the computer program is executed by a processor, the steps of any one of the method embodiments described above are implemented.

According to an aspect of the present disclosure, there is provided a computer program product, comprising a computer program, wherein when the computer program is executed by a processor, the steps of any one of the method embodiments described above are implemented.

Illustrative examples of such a computer device, a non-transitory computer-readable storage medium, and a computer program product will be described below in conjunction with FIG. 12.

Figure 12:
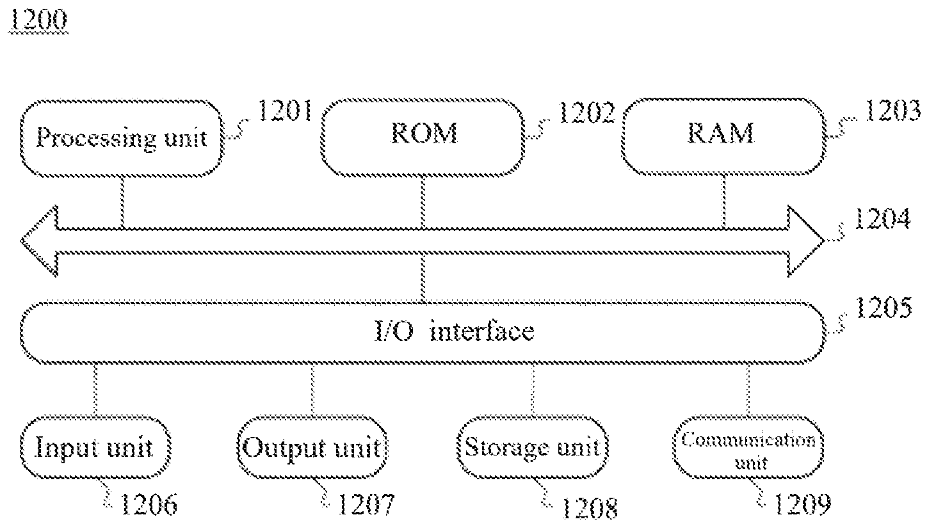
FIG. 12 is a structural block diagram of an example electronic device that can be used to implement an embodiment of the present disclosure.

FIG. 12 is a structural block diagram of an example electronic device 1200 that can be used to implement an embodiment of the present disclosure. The electronic device 1200 is an example of a hardware device that can be applied to various aspects of the present disclosure. The term "electronic device" is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 12, the device 1200 comprises a computing unit 1201, which may perform various appropriate actions and processing according to a computer program stored in a read-only memory (ROM) 1202 or a computer program loaded from a storage unit 1208 to a random access memory (RAM) 1203. The RAM 1203 may further store various programs and data required for the operation of the device 1200. The processing unit 1201, the ROM 1202, and the RAM 1203 are connected to each other through a bus 1204. An input/output (I/O) interface 1205 is also connected to the bus 1204.

A plurality of components in the device 1200 are connected to the I/O interface 1205, including: an input unit 1206, an output unit 1207, the storage unit 1208, and a communication unit 1209. The input unit 1206 may be any type of device capable of entering information to the device 1200. The input unit 1206 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 1207 may be any type of device capable of presenting information, and may include, but is not limited to, a display, a speaker, a video/audio output terminal, a vibrator, and/or a printer. The storage unit 1208 may include, but is not limited to, a magnetic disk and an optical disc. The communication unit 1209 allows the device 1200 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 1302.11 device, a Wi-Fi device, a WiMax device, a cellular communication device and/or the like.

The processing unit 1201 may be various general-purpose and/or special-purpose processing components with processing and computing capabilities. Some examples of the processing unit 1201 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The processing unit 1201 performs the various methods and processing described above, such as the method for presenting a virtual representation of a real space. For example, in some embodiments, the method for presenting a virtual representation of a real space may be implemented as a computer software program, which is tangibly contained in a machine-readable medium, such as the storage unit 1208. In some embodiments, a part or all of the computer program may be loaded and/or installed onto the device 1200 via the ROM 1202 and/or the communication unit 1209. When the computer program is loaded to the RAM 1203 and executed by the computing unit 1201, one or more steps of the method for presenting a virtual representation of a real space described above can be performed. Alternatively, in other embodiments, the computing unit 1201 may be configured, by any other suitable means (for example, by means of firmware), to perform the method for presenting a virtual representation of a real space.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may comprise: the systems and technologies are implemented in one or more computer programs, wherein the one or more computer programs may be executed and/or interpreted on a programmable system comprising at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

A program code used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and pointing apparatus (for example, a mouse or a trackball) through which the user can provide an input to the computer. Other types of apparatuses can also be used to provide interaction with the user: for example, feedback provided to the user can be any form of sensory feedback (for example, visual feedback, auditory feedback, or tactile feedback), and an input from the user can be received in any form (including an acoustic input, voice input, or tactile input).

The systems and technologies described herein can be implemented in a computing system (for example, as a data server) comprising a backend component, or a computing system (for example, an application server) comprising a middleware component, or a computing system (for example, a user computer with a graphical user interface or a web browser through which the user can interact with the implementation of the systems and technologies described herein) comprising a frontend component, or a computing system comprising any combination of the backend component, the middleware component, or the frontend component. The components of the system can be connected to each other through digital data communication (for example, a communications network) in any form or medium. Examples of the communications network comprise: a local area network (LAN), a wide area network (WAN), and the Internet.

A computer system may comprise a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present disclosure can be performed in parallel, in order, or in a different order, provided that the desired result of the technical solutions in the present disclosure can be achieved, which is not limited herein.

Although the embodiments or examples of the present disclosure have been described with reference to the drawings, it should be understood that the methods, systems, and devices described above are merely example embodiments or examples, and the scope of the present disclosure is not limited by the embodiments or examples, and is only defined by the scope of the granted claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A method for presenting a virtual representation of a real space, comprising:

obtaining a plurality of color images and a plurality of depth images respectively corresponding to the plurality of color images, wherein the plurality of color images correspond to respective partial scenes of the real space that are observed at a plurality of observation points in the real space, and the plurality of depth images respectively contain depth information of the respective partial scenes;

for any observation point, superimposing a color image in the plurality of color images that corresponds to the observation point and a depth image in the plurality of depth images that corresponds to the color image, to obtain a superimposed image;

respectively mapping respective superimposed images corresponding to the plurality of observation points to a plurality of spheres in a virtual space, such that any of the spheres corresponds to a respective one of the plurality of observation points and comprises a plurality of vertices, any vertex having respective color information and respective depth information;

performing spatial transformation on the vertices of the plurality of spheres in the virtual space based on a relative spatial relationship between the plurality of observation points in the real space;

for any vertex of any of the spheres, performing spatial editing on the vertex based on the depth information of the vertex, wherein the performing spatial editing on the vertex based on the depth information of the vertex comprises:

obtaining the depth information of the vertex;

normalizing a depth value represented by the depth information;

multiplying the normalized depth value by a radius of the sphere where the vertex is located, to obtain an offset distance, wherein the offset distance corresponds to the depth information of the vertex; and moving coordinates of the vertex by the offset distance along a normal of the vertex; and for any vertex of any of the spheres, performing shading on the vertex based on the color information of the vertex, to obtain, for presentation, respective virtual representations, in the virtual space, of the respective partial scenes of the real space.

2. The method of claim 1, wherein the performing spatial transformation on the vertices of the plurality of spheres in the virtual space based on the relative spatial relationship between the plurality of observation points in the real space comprises:

for any vertex of any of the spheres, performing spatial transformation on coordinates of the vertex by using a spatial transformation matrix, wherein the spatial transformation comprises at least one selected from a group consisting of scaling, rotation, and translation.

3. The method of claim 2, wherein the spatial transformation comprises rotation, and an angle of the rotation is based on a degree of coincidence between the partial scene observed at an observation point corresponding to the sphere where the vertex is located and the partial scene observed at other observation points in the plurality of observation points.

4. The method of claim 2, wherein the spatial transformation comprises translation, and a distance of the translation is based on a relative spatial position between an observation point corresponding to the sphere where the vertex is located and other observation points in the plurality of observation points.

5. The method of claim 1, wherein the performing shading on the vertex based on the color information of the vertex comprises:

inputting the color information of the vertex and coordinates of the vertex to a fragment shader to perform the shading.

6. The method of claim 1, further comprising:

presenting, in a view, a first virtual representation of the respective virtual representations, wherein the first virtual representation corresponds to a current observation point in the plurality of observation points.

7. The method of claim 6, further comprising:

in response to detecting a user operation indicating a movement from the current observation point to another observation point in the plurality of observation points, refreshing the view to present a second virtual representation of the respective virtual representations, wherein the second virtual representation corresponds to the another observation point.

8. The method of claim 1, wherein the performing spatial editing on the vertex based on the depth information of the vertex is performed before the performing spatial transformation on the vertices of the plurality of spheres in the virtual space.

9. The method of claim 1, wherein the plurality of spheres have a same radius.

10. The method of claim 1, wherein the obtaining the plurality of color images and the plurality of depth images respectively corresponding to the plurality of color images comprises:

receiving the plurality of color images and the plurality of depth images from a server.

11. The method of claim 1, further comprising:

before the obtaining the plurality of color images and the plurality of depth images respectively corresponding to the plurality of color images, obtaining a plurality of groups of original color images, any group of original color images being color images captured from different directions at a respective one of the plurality of observation points; and compositing any group of original color images into a respective single composite color image as a color image corresponding to a partial scene in the real space that is observed at the respective observation point.

12. The method of claim 11, wherein any group of original color images comprises six color images of the real space that are respectively captured from six directions: up, down, left, right, front, and back at the respective observation point.

13. The method of claim 12, wherein the compositing any group of original color images into the respective single composite color image comprises:

compositing the group of original color images into the composite color image through Gauss-Krüger projection.

14. The method of claim 11, further comprising:

before the obtaining the plurality of color images and the plurality of depth images respectively corresponding to the plurality of color images, obtaining a plurality of groups of original depth images, any group of original depth images being depth images captured from the different directions at the respective one of the plurality of observation points; and compositing any group of original depth images into a respective single composite depth image as a depth image comprising depth information of the partial scene in the real space that is observed at the respective observation point.

15. A computer device, comprising:

one or more storage devices;

one or more processors; and one or more computer programs stored on the one or more storage devices, wherein the one or more processors are configured to execute the one or more computer programs, individually or collectively, to perform operations comprising:

obtaining a plurality of color images and a plurality of depth images respectively corresponding to the plurality of color images, wherein the plurality of color images correspond to respective partial scenes of a real space that are observed at a plurality of observation points in the real space, and the plurality of depth images respectively contain depth information of the respective partial scenes;

for any observation point, superimposing a color image in the plurality of color images that corresponds to the observation point and a depth image in the plurality of depth images that corresponds to the color image, to obtain a superimposed image;

respectively mapping respective superimposed images corresponding to the plurality of observation points to a plurality of spheres in a virtual space, such that any of the spheres corresponds to a respective one of the plurality of observation points and comprises a plurality of vertices, any vertex having respective color information and respective depth information;

performing spatial transformation on the vertices of the plurality of spheres in the virtual space based on a relative spatial relationship between the plurality of observation points in the real space;

for any vertex of any of the spheres, performing spatial editing on the vertex based on the depth information of the vertex, wherein the performing spatial editing on the vertex based on the depth information of the vertex comprises:

obtaining the depth information of the vertex;

normalizing a depth value represented by the depth information;

multiplying the normalized depth value by a radius of the sphere where the vertex is located, to obtain an offset distance, wherein the offset distance corresponds to the depth information of the vertex; and moving coordinates of the vertex by the offset distance along a normal of the vertex; and for any vertex of any of the spheres, performing shading on the vertex based on the color information of the vertex, to obtain, for presentation, respective virtual representations, in the virtual space, of the respective partial scenes of the real space.

16. A non-transitory computer-readable storage medium having one or more computer programs stored thereon, wherein the one or more computer programs, when executed by one or more processors, individually or collectively, perform operations comprising:

obtaining a plurality of color images and a plurality of depth images respectively corresponding to the plurality of color images, wherein the plurality of color images correspond to respective partial scenes of a real space that are observed at a plurality of observation points in the real space, and the plurality of depth images respectively contain depth information of the respective partial scenes;

for any observation point, superimposing a color image in the plurality of color images that corresponds to the observation point and a depth image in the plurality of depth images that corresponds to the color image, to obtain a superimposed image;

respectively mapping respective superimposed images corresponding to the plurality of observation points to a plurality of spheres in a virtual space, such that any of the spheres corresponds to a respective one of the plurality of observation points and comprises a plurality of vertices, any vertex having respective color information and respective depth information;

performing spatial transformation on the vertices of the plurality of spheres in the virtual space based on a relative spatial relationship between the plurality of observation points in the real space;

for any vertex of any of the spheres, performing spatial editing on the vertex based on the depth information of the vertex, wherein the performing spatial editing on the vertex based on the depth information of the vertex comprises:

obtaining the depth information of the vertex;

normalizing a depth value represented by the depth information;

multiplying the normalized depth value by a radius of the sphere where the vertex is located, to obtain an offset distance, wherein the offset distance corresponds to the depth information of the vertex; and moving coordinates of the vertex by the offset distance along a normal of the vertex; and for any vertex of any of the spheres, performing shading on the vertex based on the color information of the vertex, to obtain, for presentation, respective virtual representations, in the virtual space, of the respective partial scenes of the real space.

* * * * *